INTRINSICALLY SAFE SWITCHING SYSTEMS

Filed Oct. 31, 1963

Inventor
William H. Elliot
By Thomas E Torphy
Attorney

United States Patent Office 3,309,542
Patented Mar. 14, 1967

3,309,542
INTRINSICALLY SAFE SWITCHING SYSTEMS

William H. Elliot, Whitefish Bay, Wis., assignor to Cutler-Hammer, Inc., Milwaukee, Wis., a corporation of Delaware Filed Oct. 31, 1963, Ser. No. 320,487
7 Claims. (Cl. 307—136)

Figure 1:
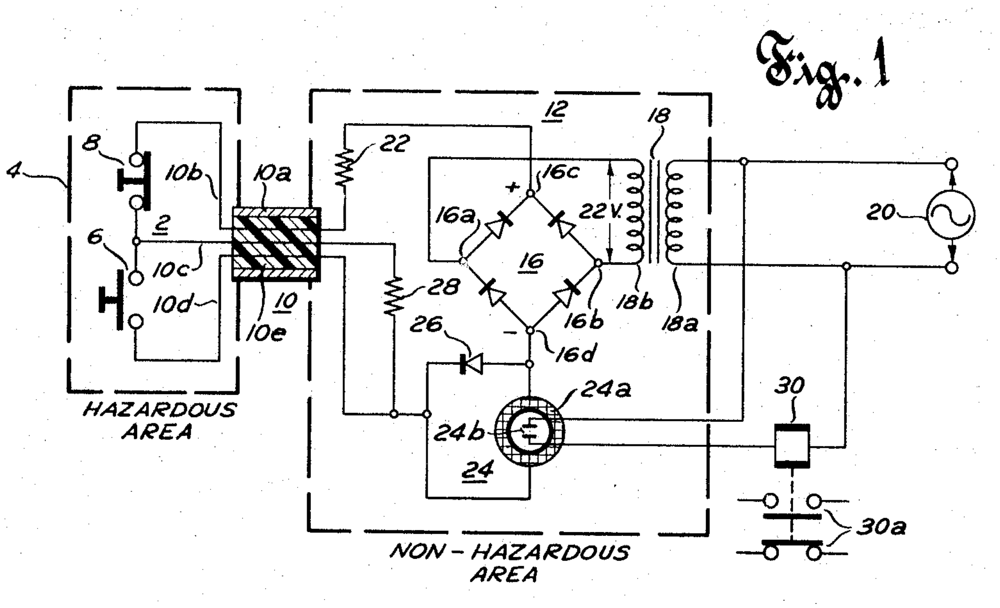

This invention relates to intrinsically safe switching systems for controlling electroresponsive devices.

More particularly, the invention relates to electrical switching systems having intrinsically safe pilot circuits which may be located in a hazardous area for controlling electroresponsive devices in a nonhazardous area, the hazardous area being one where combustible or explosive gas or dust may be present.

An object of the invention is to provide improved intrinsically safe switching systems.

A more specific object of the invention is to provide intrinsically safe switching systems affording use of longer electrical conductors connecting a pilot or control circuit in the hazardous area to an electroresponsive circuit in a nonhazardous area.

Another specific object of the invention is to provide intrinsically safe switching systems having a lower power level at the control circuit in the hazardous area thereby to afford use thereof in more sensitive atmospheres such as acetylene-hydrogen-air mixtures.

Other objects and advantages of the invention will hereinafter appear.

William H. Elliott copending application Ser. No. 151,306, filed Nov. 6, 1961, now Patent No. 3,193,710, issued July 6, 1965, discloses intrinsically safe switching systems wherein alternating current power is applied from the nonhazardous area to general purpose pilot or control circuits in the hazardous area and wherein the power levels applied to the pilot circuits are such that they are suitable and safe for use in ethyl-ether-air mixtures. While the systems disclosed in the copending application are suitable for the purposes intended, this invention relates to improvements thereon. According to this invention, there are provided means whereby the conductors or cable between the pilot devices in the hazardous area and the relay operating circuit in the nonhazardous areas may be made much longer without affecting the proper control of the relay in the nonhazardous area. Use of alternating current power at the pilot devices imposes certain limitations on the length of cable that can be used to connect the pilot devices to the relay operating circuit. For example, a cable over 500 feet long might provide sufficient capacitance to maintain the relay energized when the pilot switch is opened. To avoid such undesired effects, the invention provides a system wherein the pilot devices are connected to the rectified or direct current part of the circuit thereby avoiding the alternating current impedance effects of the connecting leads. According to the invention, there is also provided a system having a pilot device that is safely operable in atmospheres that are more sensitive than the aforementioned ethyl-ether-air mixture such as for example, acetylene-hydrogen-air mixtures. For this purpose, the invention provides a system having greater sensitivity to operation of the pilot switch thereby affording use of a lower power level at the pilot circuit in the hazardous area as hereinafter described.

Figure 2:
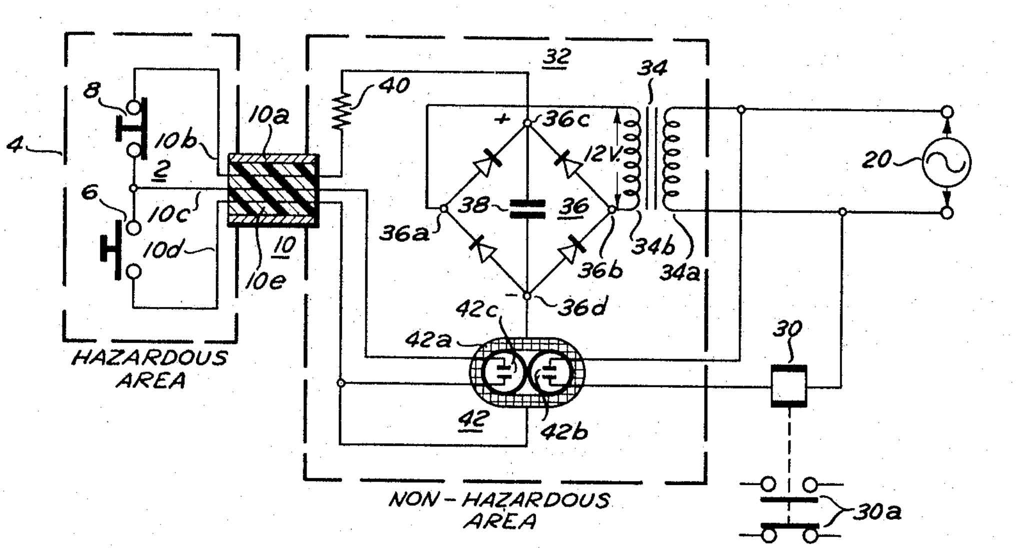

These and other objects and advantages of the invention and the manner of obtaining them will best be understood by reference to the following description of embodiments thereof taken in conjunction with the accompanying drawings, wherein:

FIGURE 1 is a circuit diagram of an intrinsically safe switching system constructed in accordance with the invention; and FIG. 2 is a circuit diagram of a modification of the system of FIG. 1.

Referring to FIG. 1, there is shown an intrinsically safe switching system having a pilot circuit suitable for safe use in Class I, Groups C and D, hazardous atmospheres as defined in Article 500 of the 1962 National Electrical Code published by the National Board of Fire Underwriters. Class I includes those atmospheres containing inflammable gases or vapors in quantities sufficient to produce explosive or ignitible mixtures. Group C includes atmospheres containing ethyl-ether vapors, ethylene, or cyclo-propane. Group D includes less hazardous atmospheres containing gasoline, hexane, naphtha, benzine, butane, propane, alcohol, actone, benzol, lacquer solvent vapors, or natural gas. FIG. 2 illustrates an intrinsically safe switching system modified to provide a pilot circuit suitable for safe use in the more hazardous atmospheres of Class I, Groups A and B. Group A comprises atmospheres containing acetylene and Group B includes atmospheres containing hydrogen or gases or vapors of equivalent hazard such as manufactured gas.

In FIG. 1, a general purpose pilot switching station 2 which may be mounted in a hazardous atmosphere comprises an enclosure 4 in which are mounted a start switch 6 and a stop switch 8. Switching station 2 is of the economical general purpose type in that it is not sealed or provided with an explosion proof enclosure. An electrical conduit 10, which may be up to 5000 feet in length, connects the pilot switching station to either of the control circuits 12 or 32 in FIGS. 1 and 2, respectively, in the nonhazardous area. The elements of control circuits 12 and 32 are imbedded in a plastic material (not shown) to improve electrical insulation and to make the assembly more rugged. The conduit 10 comprises a metallic sheath **10*a*, three conductors 10*b*, 10*c* and 10*d*, and an insulating sealing material 10*e* which surrounds the conductors and seals the interior of sheath 10*a* to prevent the passage of hazardous atmosphere through the conduit 10. Although sealing material may fill conduit 10** uninterruptedly for its entire length, it usually takes the form of plugs at spaced intervals.

Control station 12 of FIG. 1 includes a full wave bridge rectifier 16 having input terminals **16*a* and 16*b* and output terminals 16*c* and 16*d*. The A.-C. input to bridge 16 is supplied by a voltage reducing transformer 18 which in this case reduces the line voltage from A.-C. source 20 to 22 volts at the input terminals 16*a* and 16*b*. Terminal 16*c* is connected to conductor 10*b* through a current limiting resistor 22. The other D.-C. output terminal 16*d* is connected to the operating coil 24*a* of a sensitive reed relay 24 which has normally open contacts 24*b*. A diode 26 is connected across coil 24*a* for discharging the stored inductive energy of coil 24*a* upon its deenergization. A maintaining resistor 28 is connected in shunt of switch 6 to maintain reed switch 24 energized after switch 6 has been momentarily closed to cause reed switch 24 to pick up. Contacts 24*b* are connected in circuit with a controlled device which, as illustrated, is a control relay 30. Contacts 30*a*** are for connection in circuit with the device (not shown) to be ultimately controlled.

The control system of FIG. 2 has a pilot switching station 2 which is similar to that of FIG. 1. For the sake of simplicity certain elements of FIG. 2 which are the same as those of FIG. 1 are given the same reference numerals. The control station 32 of FIG. 2 includes a step-down transformer 34 which reduces the A.-C. line voltage from source 20 to 12 volts. A full wave bridge rectifier 36 has input terminals **36*a* and 36*b*** connected to the secondary of transformer 34. A smoothing capacitor 38 is connected across the output terminals 36c and 36d. A current limiting resistor 40 is connected between terminal 36c and conductor 10b. The other output terminal 36d is connected to the operating coil 42a of a highly sensitive reed relay 42 having two sets of normally open contacts 42b and 42c. Contacts 42c are maintaining contacts for maintaining relay 42 energized after switch 6 momentarily closed to cause relay 42 to pick up. Contacts 42b are connected in circuit with the control relay 30.

The operation of the circuits will now be explained.

The primary winding 18a of step-down transformer 18 is energized by source 20 which, for example, might deliver 110 volts. The secondary winding 18b, as a result, impresses 22 volts A.-C. on the input terminals 16a and 16b of rectifier bridge 16. A D.-C. voltage thereupon appears between the positive rectifier output terminal 16c and the negative terminal 16d. A very small current flows from terminal 16c through resistor 22, conductor 10b, switch 8, conductor 10c, resistor 28, and coil 24a to terminal 16d. This current is of such small magnitude as to be insufficient to cause reed relay 24 to pick up and close contacts 24b. Upon the momentary closing of start switch 6, the resistance 28 is shunted and an increased current flows through coil 24a. This current is sufficient to cause the sensitive reed relay 24 to pick up, but is limited in magnitude by resistor 22 to a value insufficient to cause ignition of Class I, Group C or D atmospheres upon the opening of switch 6. As relay 24 picks up, contacts 24b close to complete the energization circuit to control relay 30. The resistance of resistor 28 is selected to permit a current flow which is sufficient to maintain relay 24 actuated but insufficient to cause relay 24 to pick up. Therefore when momentary switch 6 reopens, contacts 24b are maintained closed and control relay 30 remains energized.

Relay 30 is caused to be deenergized by pressing the stop switch 8. The current flow through resistor 22 and 28 to coil 24a is interrupted by the opening of switch 8. Relay 24 is thereupon deenergized and contacts 24b open to deenergize relay 30. The current interrupted by opening switch 8 is limited by resistor 22 to a value insufficient to cause, at switch 8, arcing of sufficient strength to ignite atmospheres of Class I, Groups C and D. This current is so limited even if resistor 28 should happen to be shunted by switch 6. The possibility of dangerous arcing is further reduced by diode 26 which discharges inductive energy which is stored in coil 24a and which is released upon reduction of the energizing current to coil 24a.

It is to be noted that the presence of direct current in the conductors 10b, 10c and 10d reduces any capacitive effects between these conductors which might occur with alternating current. With sufficient conduit length, the use of A.-C. could permit a current flow to coil 24a to maintain relay 24 energized after switch 8 opens. The use of direct current in conductors 10b, 10c and 10d therefore permits the use of longer conductors and more remote placement of station 2 from the control circuit 12.

FIG. 2 illustrates a variation in circuitry which is suitable for use in more hazardous areas including atmospheres of Class I, Groups A and B. The remote switching station, the power source 20, the conduit 10 and the control relay 30 are similar to the corresponding elements of FIG. 1. The application of A.-C. voltage from source 20 to the primary winding 34a of step-down transformer 34 causes an A.-C. voltage of 12 volts to appear across the secondary winding 34b of transformer 34 and terminals 36a and 36b of rectifier bridge 36. A D.-C. voltage, smoothed by capacitor 38, consequently appears between the positive terminal 36c and the negative terminal 36d.

The highly sensitive reed relay 42 is energized by the momentary closing of switch 6 which permits a current to flow from terminal 36c through current limiting resistor 40, conductor 10b, normally closed switch 8, switch 6, conductor 10d, and coil 42a to terminal 36d. Reed relay 42 thereupon picks up and contacts 42b and 42c close. Contacts 42b complete the energizing circuit to relay 30. Contacts 42c complete a maintaining circuit in shunt of switch 6 to maintain reed relay 42 energized after switch 6 reopens. The subsequent opening of stop switch 8 interrupts the energizing circuit to coil 42a to cause relay 42 to drop out. Contacts 42b open to deenergize control relay 30 and contacts 42c open to interrupt the maintaining circuit in shunt of start switch 6. The energizing current for coil 42a is limited by the resistor 40 to values incapable of causing, at switches 6 and 8, arcing of sufficient energy to ignite atmospheres of Class I, Groups A and B. As in the circuit of FIG. 1, the use of direct current in conductors 10b, 10c and 10d reduces unwanted capacitive effects and permits more remote placement of station 2.

The use of the maintaining contact 42c in the system of FIG. 2 instead of the maintaining resistor 28 as in the system of FIG. 1 has the advantage of permitting the use of a more sensitive reed relay. In the system of FIG. 1 there is always some current flowing through resistor 28 to coil 24a, and a large increase in line voltage from source 20 could cause spurious actuation of the reed relay 24 if the reed relay 24 were of a very sensitive type. In the system of FIG. 2 for use in more hazardous atmospheres, the use of maintaining contact 42c eliminates current flow through coil 42a when reed relay 42 is not in its actuated state. Line voltage variations consequently will not affect the relay and a more sensitive reed relay can be used. The greater sensitivity of the reed relay in turn reduces the coil current necessary for its actuation. The current to be interrupted by switches 6 and 8 and the associated arcing hazard can therefore be reduced by using an increased resistance in resistor 40 and a reduced voltage from the secondary 34b of transformer 34.

While the invention hereinbefore described in effectively adapted to fulfill the objects stated, it is to be understood that I do not intend to confine my invention to the particular embodiments disclosed since they are susceptible of various modifications without departing from the scope of the appended claims.

I claim:

1. A system for controlling from an intrinsically safe control station located in an area where a hazardous atmospheric mixture may be present an electroresponsive device located in a nonhazardous area comprising:

general purpose switching means at the hazardous area;

a control circuit at the nonhazardous area for controlling energization of the electroresponsive device;

a sealed electric conduit comprising conductors connecting said control station to said control circuit and preventing passage therethrough of the hazardous atmospheric mixture from the hazardous area to the nonhazardous area;

and said control circuit comprising sensitive electroresponsive means;

a source of direct current for supplying unidirectional energy to said sensitive electroresponsive means;

means connecting said switching means through said electric conduit in circuit with said sensitive electroresponsive means and said source of direct current for controlling the energization of said sensitive electroresponsive means and reducing any capacitive effect in the conductors between said switching means and said control circuit;

and means connecting in circuit said sensitive electroresponsive means, said switching means and said source of direct current for transmitting to said switching means at the hazardous area an amount of unidirectional electrical energy insufficient to cause ignition of the hazardous atmosphere when said switching means is operated but sufficient to cause operation of said sensitive electroresponsive means when said switching means is operated.

2. The invention defined in claim 1 in which said current transmitting means limits the electrical energy to said switching means to a value such that said switching means is intrinsically safe in atmospheric mixtures belonging to Groups A and B of the National Electrical Code.

3. The invention defined in claim 1 in which said current transmitting means limits the electrical energy to said switching means to a value such that said switching means is intrinsically safe in atmospheric mixtures belonging to Groups C and D of the National Electrical Code.

4. A system for controlling from an intrinsically safe control station located in a hazardous area where a spark-ignitable atmospheric mixture may be present an electroresponsive device located in a nonhazardous area comprising:

a general purpose switching control station at the hazardous area;

a control circuit at the nonhazardous area for controlling energization of the electroresponsive device;

a sealed electric conduit comprising conductors connecting said control station to said control circuit and preventing passage therethrough of the ignitable atmospheric mixture from the hazardous area to the nonhazardous area;

and said control circuit comprising an alternating current power supply source;

a voltage reducing transformer connected to said source;

sensitive electroresponsive means having electrically energizable operating means and means responsive thereto for controlling the energization of said electroresponsive device;

rectifier means connected to said transformer for supplying unidirectional electric energy to said operating means of said sensitive electroresponsive means;

resistor means in circuit with said control station for limiting the current applied thereto;

and means connecting said control station and said resistor means to the direct current side of said rectifier means to reduce any capacitive effect in the conductors between said control station and said control circuit;

and said control station comprising switching means for causing operation of said sensitive electroresponsive means.

5. The system as defined in claim 4 in which said switching means comprises:

a switch for shunting a portion of said resistor means to cause energization of said sensitive electroresponsive means;

and a switch for interrupting the current to said sensitive electroresponsive means to cause deenergization thereof.

6. The system as defined in claim 4 in which said sensitive electroresponsive means is a reed relay having an operating coil and contacts for controlling the energization of said electroresponsive device.

7. A system for controlling from an intrinsically safe control station located in a hazardous area where a spark ignitable atmospheric mixture may be present an electroresponsive device located in a nonhazardous area comprising:

a switching control station in a hazardous area;

a control circuit at the nonhazardous area for controlling energization of the electroresponsive device;

a sealed electric conduit comprising conductors connecting said control station to said control circuit and preventing passage therethrough of the ignitable atmospheric mixture from the hazardous area to the nonhazardous area;

a voltage reducing transformer connected to said source;

an electroresponsive reed switch having an operating coil and at least two sets of contacts, one of said sets of contacts comprising normally open maintaining contacts in series with said operating coil of said reed switch and another set of contacts for controlling the energization of said electroresponsive device;

rectifier means connected to said transformer for supplying unidirectional electric energy to said operating coil of said reed switch;

resistor means in circuit with said control station for limiting the current applied thereto;

means connecting said control station and said resistor means to the direct current side of said rectifier means to reduce any capacitive effect in the conductors between said control station and said control circuit;

and said control station comprising a normally open switch for shunting, when actuated, said maintaining contacts to cause operation of said reed switch and a normally closed switch in series with said maintaining contacts to cause, when actuated, the deenergization of said reed switch.

References Cited by the Examiner

UNITED STATES PATENTS

| | | | |
|---|---|---|---|
| 2,825,050 | 2/1958 | Hausten | 317—154 |
| 3,193,710 | 7/1965 | Elliot | 307—136 |

FOREIGN PATENTS

| | | |
|---|---|---|
| 1,127,707 | 12/1956 | France. |
| 762,224 | 11/1956 | Great Britain. |

MILTON O. HIRSHFIELD, *Primary Examiner.*

LEE T. HIX, *Examiner.*

D. YUSKO, *Assistant Examiner.*